United States Patent [19]

Margiloff

[11] 4,365,581
[45] Dec. 28, 1982

[54] TRAFFIC SIGNALING ATTACHMENT DEVICE FOR BICYCLES

[76] Inventor: Henry Margiloff, 1817 S. Ocean Dr., West Bldg., PH 28, Hallandale, Fla. 33009

[21] Appl. No.: 335,106

[22] Filed: Dec. 28, 1981

[51] Int. Cl.³ .............................................. B60Q 1/30
[52] U.S. Cl. ...................................... 116/52; 116/56
[58] Field of Search ...................... 116/52, 56, 60, 37, 116/53, 313, 54

[56] References Cited

U.S. PATENT DOCUMENTS

| | | | |
|---|---|---|---|
| 651,177 | 6/1900 | Booth | 116/60 |
| 3,099,243 | 7/1963 | Schwartz | 116/56 |
| 4,038,935 | 8/1977 | Margiloff | 116/52 |
| 4,145,989 | 3/1979 | Hatcher | 116/56 |
| 4,157,075 | 6/1979 | Kirvutza | 116/56 |

Primary Examiner—Steven L. Stephan
Assistant Examiner—Denis E. Corr
Attorney, Agent, or Firm—Ernest H. Schmidt

[57] ABSTRACT

A traffic signaling attachment device for bicycles has a supporting framework securable at one end to the bicycle post clamp, pivotally journaled along which framework is a control rod having a manually actuateable handle at the front end just forward of the seat, and a perpendicularly outwardly-extending signal arm at the other end normally supported in perpendicularly-upwardly-extending position but adapted to be manually set for left or right turn signaling, or caution signaling, with a waving motion actuated by cranking of the sprocket wheel while riding.

5 Claims, 7 Drawing Figures

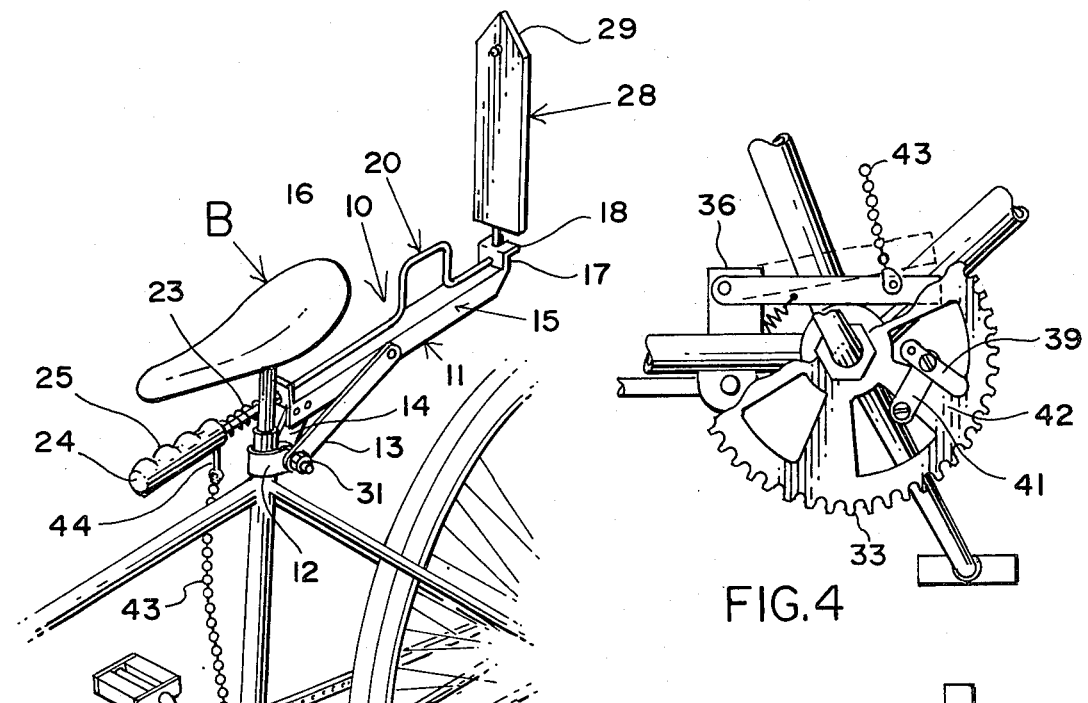
FIG.1
FIG.4
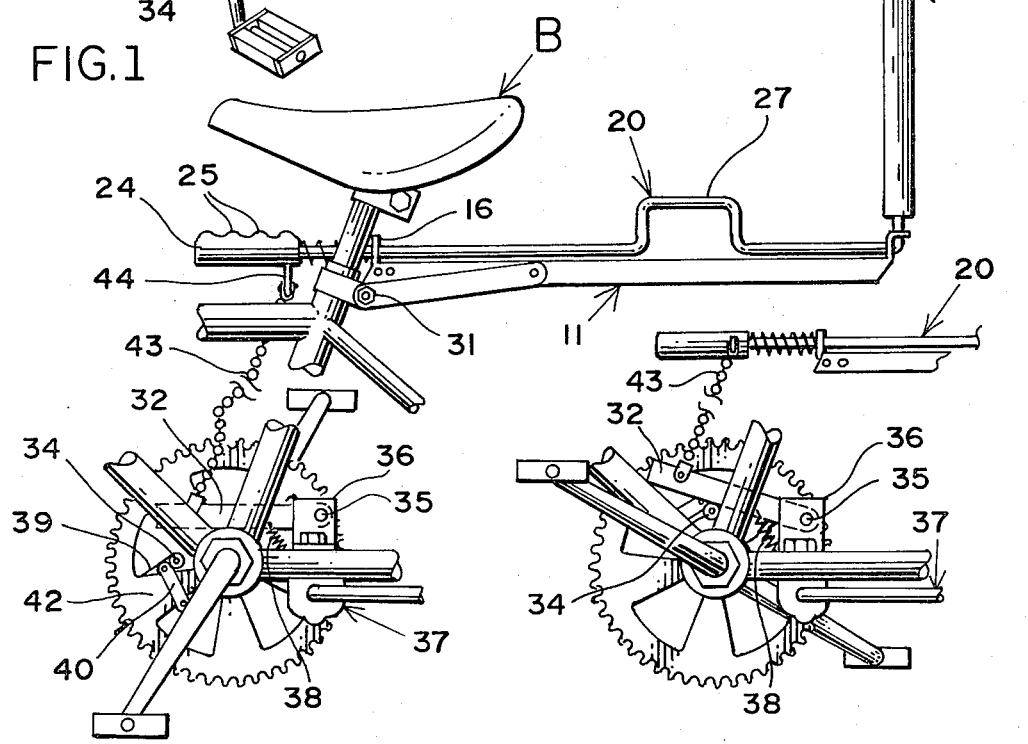
FIG.2
FIG.3

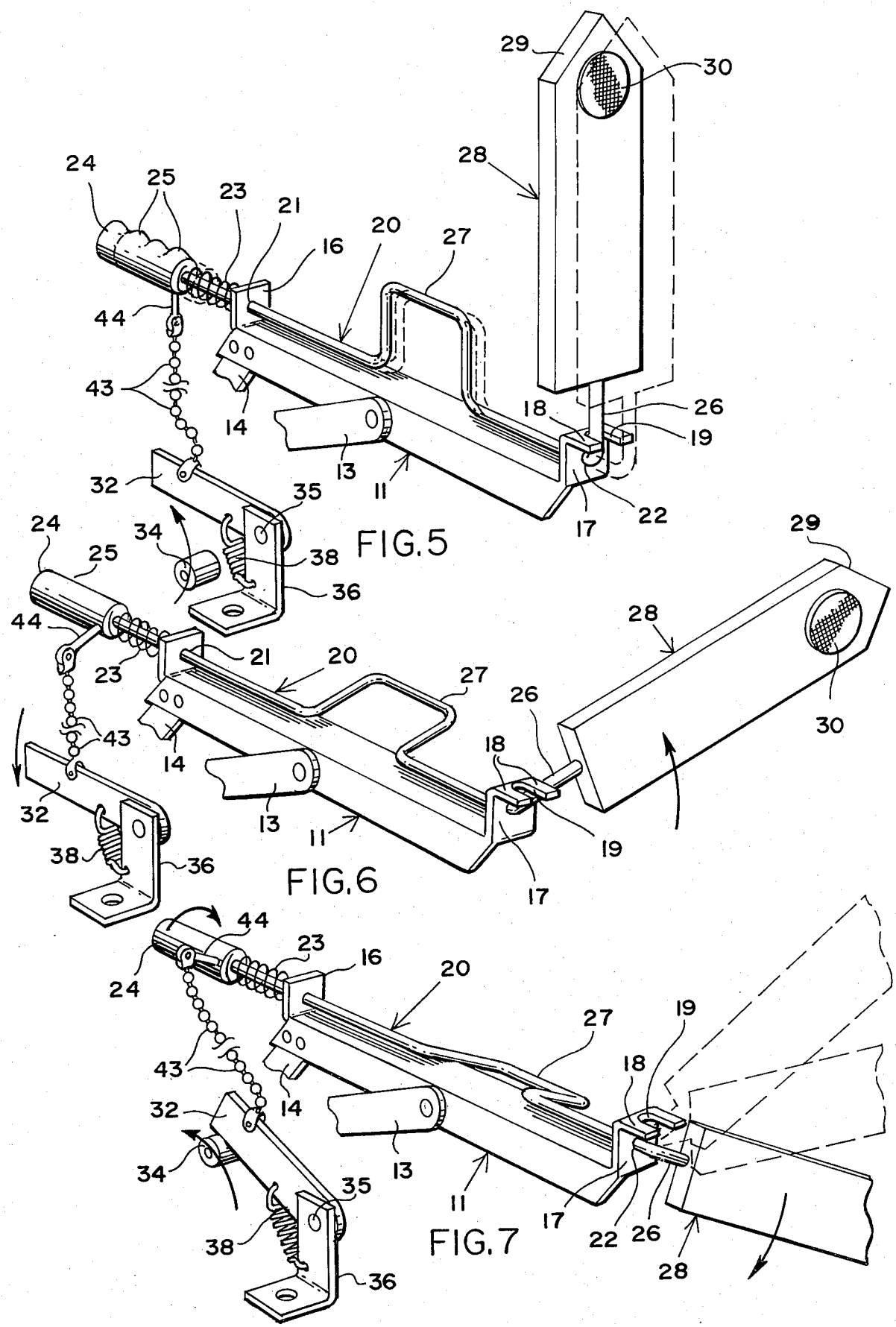

4,365,581

TRAFFIC SIGNALING ATTACHMENT DEVICE FOR BICYCLES

This invention relates to bicycling, and is directed particularly to traffic signaling attachments and devices for mechanically signaling both oncoming traffic and traffic approaching from behind that the rider wishes to make a left or right-hand turn or, alternatively, to caution traffic of any condition that the rider may consider to be hazardous and to direct approaching traffic from behind to change lanes to avoid the bicycle. The invention is an improvement over the traffic signaling attachment device described and illustrated in my U.S. Pat. No. 4,038,935, issued Aug. 2, 1977.

The principal object of this invention is to eliminate the need for the hand of the bicycle rider to turn the signal in a waving motion, to provide a new and novel means to cause the bicycle signal to automatically and continuously wave, presenting an arc of such high visibility as to capture the attention of following traffic and directing such traffic to turn away and around the bicycle rider, much like the flagman at a construction site waves his flag and directs traffic into other channels.

Another object of this invention is to provide a novel and improved signaling attachment device for bicycles including a signal arm member prominently visible to both oncoming traffic and traffic approaching from behind, and which can readily be manually actuated by the bicycle rider to move from its normal upwardly-projecting position either to the left or to the right, whereupon it becomes mechanically linked with the foot crank or sprocket wheel to effect an automatic and continuously waving-like motion, with left-hand or right-hand signaling, selectively, and directing traffic following from behind to move to other lanes away from the bicycle.

A more particular object of the invention is to provide a traffic signaling attachment device for bicycles which can readily be assembled to an ordinary bicycle simply by attachment to existing bolts on the bicycle framework, and wherein signaling waving actuation of the control arm is automatically accomplished by mechanism interconnected with the foot crank sprocket wheel. An auxiliary handle is provided just behind the seat for alternative use by skirt wearing female riders.

Another object of this invention is to provide a pedal power source that can operate all forms of attachments on bicycles, such as, turning or flashing lights, reflectors intermittent sounding devices, etc. when riding a bicycle.

Still another object of the invention is to provide a traffic signaling device of the character described wherein the signaling arm, although of substantial length for good visibility with respect to both oncoming and following traffic, is at the same time readily bendable and self-erecting so as to not interfere with mounting and dismounting of the bicycle in the usual fashion of swinging the leg over the seat.

BRIEF DESCRIPTION OF THE DRAWINGS

In the drawings, wherein like reference numerals denote corresponding parts throughout the several views;

FIG. 1 is a perspective view of a traffic signaling attachment device for bicycles embodying the invention, shown assembled to a bicycle;

FIG. 2 is a partial side-elevational view showing the signal arm member in its deactivated, upright position;

FIG. 3 is a side elevational view of the foot crank sprocket mechanism illustrating how, on turning of the sprocket wheel, the control rod is actuated to produce the wagging motion of the signal arm member when manually positioned to one side or the other;

FIG. 4 is similar to FIG. 3 as seen from the opposite or sprocket wheel side of the bicycle and further illustrates mechanical details of the operating mechanism;

FIG. 5 is an oblique view showing details of the signal arm member and its actuating rod control mechanism, in deactuated position;

FIG. 6 is an oblique view similar to that of FIG. 5 but showing the signal arm member in manually released position for signaling to the right of the bicycle when viewed from behind; and FIG. 7 is an oblique view similar to that of FIG. 6 showing how the sprocket wheel can pin actuates the cam lever to automatically wag the signal arm member while the bicycle is being ridden.

Referring now in detail to the drawings, reference numeral 10 designates, generally, a traffic signaling attachment device embodying the invention shown assembled to a bicycle B, (partially illustrated in FIGS. 1 and 2). As best illustrated in FIGS. 1, 2 and 5, the signaling attachment device 10 comprises a supporting framework 11 attached at its forward end to the seat support clamp 12 of a typical bicycle with use of support brackets 13, 14 at each side, as is hereinafter more particularly described.

The supporting framework 11 will preferably be fabricated of a length of extruded aluminum of right-angular cross section to provide a main framework member 15 the forward end of which has an upwardly-bent bracket portion 16 for the purpose hereinafter appearing. The rearward end of the main framework member 15 is formed with an upwardly-bent bracket portion 17 the upper end of which merges with the short, rearwardly-projecting portion 18 having a central longitudinal slot 19. The upwardly-projecting bracket portions 16, 17 of the main framework member 15 lie in mutually parallel planes.

The longitudinal control rod 20 extends through and is journaled in openings 21 and 22 provided in respective bracket portions 16 and 17 of the main framework member 15. The control rod 20 is bent at right angles immediately beyond its passage through the rear opening 22. The forward end of the control rod 20 extends somewhat beyond the bracket portion 16 in which it is journaled, and is yieldingly urged in the forward direction with respect to the supporting framework 11 by means of a circumjacent helical spring 23 abuttingly constrained between an outer surface portion of said bracket portion and the inner end of an increased-diameter, flexible control handle 24 secured to the forward end of said control rod. The control handle 24, when in its deactivated position as illustrated in FIG. 1, has its radially-outwardly extending-hand grip projections 25 extending in the vertically upward direction, and is indicative of the radially outwardly extending direction of the right-angularly-bent portion 26 at the rearward end of said control rod. In this connection, it is to be noted that the control handle 24 extends well beyond the inner end of the control rod 20 to which it is secured, and is flexible enough to give or bend readily if inadvertently pushed against by body portions of the bicycle rider, so as to minimize any possibility of injury.

As illustrated in FIGS. 1, 2 and 5, the control rod 20 is formed with a rectangularly-bent, normally upwardly-extending, auxiliary handle portion 27 for alternative use in controlling the signaling attachment device, particularly by female riders wearing skirts, which would ordinarily prevent use of the forward control handle 24. The opposed side rod portions of auxiliary handle portion 22 also seems to limit downward turning of the control rod 20, as is hereinbelow described.

As illustrated in FIGS. 1, 2 and 5, the helical compression spring 23 serves normally to urge the control rod 20 in the forward direction so that the right-angularly-bent portion 26 at the rearward end thereof is seated in the recess or slot 19, whereat said right-angularly-bent portion extends vertically upward. Secured to the right-angularly-bent portion 26 is a semi-rigid signal arm member 28, which may be fabricated of a foamed synthetic plastic material, for example, and which preferably terminates in a wedge-tipped pointer portion 29. The signal arm member 28 serves as a traffic signaling device and therefore will preferably be of a bright color such as red or orange for enhanced visibility. For night riding, the rear surface near the outer end of the signal arm member 28 has secured thereagainst a reflector 30 to reflect the road lighting of vehicles approaching from the rear.

As illustrated in FIGS. 1 and 2, the supporting framework 11 of the traffic signaling attachment device is applied to a bicycle simply by removing the usual securing bolt 31 of the bicycle seat support clamp 12 to permit the outer ends of the support brackets 13, 14 to be clamped in place against each side of said seat support clamp upon reassembly of the securing bolt. In this connection, it will be noted that the supporting framework 11 can be adjusted, upon its securement, both vertically about its pivotal connection by means of the clamp bolt, and horizontally by slight rotative adjustment of the seat support clamp 12. Such limited universal adjustment of the signaling attachment device provides for the best positioning of the control handle 24 under the bicycle seat so that it can conveniently be manually controlled by the bicycle rider without interference of portions of the bicycle framework or seat.

Means is provided for automatically wagging or waving the signal arm member 28 to one side or the other, selectively, while the bicycle is being ridden, after the device has been actuated by manipulation of the control handle 24 by the rider in a manner hereinafter described. To this end, the traffic signaling attachment device embodying the invention further comprises a cam lever 32 positioned between the foot crank sprocket wheel 33 and the bicycle frame, which is cooperative with a cam roller pin 34 adjustably fixed with respect to said sprocket wheel and adapted, upon the turning of said sprocket wheel, to periodically lift said cam lever in the manner and for the purpose hereinafter appearing. As best illustrated in FIGS. 1, 2 and 3, for example, the inner end of the cam lever 32 is pivotally journaled, as by a non-binding rivet 35, to a right-angular cam lever bracket 36 attached to the bicycle framework with the same nut and bolt used to attach the usual bicycle stand 37. A helical tension spring 38 secured between the horizontal arm of the bracket 36 and the cam lever 32 at a position intermediate its length, serves to yieldingly urge said cam lever to its position of rest against the hub of the sprocket wheel 33, for example (see full line position of the cam lever 32 in FIG. 4). The cam roller pin 34 is journaled to the side near one end of a roller bar 39 adjustably bolted to a pair of clamp plates 40, 41 (see FIGS. 2 and 4) having clamped therebetween one of the flatspoke portions 42 of the sprocket wheel 33. The clamp plates 40, 41 and roller bar 39 are held together by nuts and bolts permitting adjustable placement of the cam roller pin 34 in proper position at the inside of the sprocket wheel for automatic actuation of the signal arm member 28 in the manner presently to be described. To this end, the cam lever 32 and the control rod 20 are mechanically linked by a ball chain 43 secured at one end to the cam lever 32 at a position near its outer end, and affixed at the other end to a normally downwardly-extending, rigid connector post member 44 at the inner end of control handle 24.

In use of the attachment device for signaling, the rider will grasp the handle 24 of the control rod 20 and push rearward slightly to disengage the right-angularly bend portion 26 of said control rod from the recess or slot 19 in which it is seated, thereby permitting rotary movement to one side or the other as illustrated in FIG. 6, for example. During about one-half of each rotary turn of the sprocket wheel 33, the cam lever 32 will be in its position of rest, with the right-angularly-bent portion 26 of the control rod 20 abutting an outer edge portion of the rearward projection 18 of supporting framework 11. As illustrated in FIG. 6, the ball chain 43, with the control rod actuated for wagging, is of such length as to lift the cam lever 32 slightly from its normal position of rest against the downward urging of helical tension spring 38. The signal arm member 28 will thus be yieldingly constrained in its sidewardly-extending, uppermost limit position. As the sprocket wheel 33 turns so that its associated cam roller pin 34 rides with increasing height along the underedge of cam lever 32 (see FIG. 7) the lower, connected end of the ball chain 43 moves upwardly against the reactive force of spring 38, permitting the signal arm member 28 to rotate downwardly under its own weight to an angled limit position at which the side portions of control rod auxiliary handle portion 26 about upper edges, at one side or the other, of main framework member 15. Thus, no critical adjustment of the length of the ball chain 43 is required. In its wagging movement, the signal arm member 28 will be rotated through an angle of about 60 circular degrees to effect a wide angle waving motion which, it will be understood, increases in repetition rate or frequency with increase of sprocket arm rotation or bicycling speed while pedaling. It will further be understood that although the signal arm member 28 is illustrated in FIGS. 6 and 7 as actuated for signaling to the right of a bicycle as viewed from the rear, signaling to the left is effected simply by release and turning of the control handle 24 in the opposite direction.

While I have illustrated and described herein only one from in which my traffic signaling attachment device can conveniently be embodied, for pedal powered activation, it is to be understood that this form is presented by way of example only and not in a limiting sense. Thus, instead of the roller and cam lever actuating mechanism illustrated, the roller could instead be fastened to the bicycle pedals crank arm to actuate a cam lever placed at the opposite side of the frame showing the sprocket wheel. My invention, in brief, comprises all the modifications and embodiments coming within the scope and spirit of the following claims.

What I claim as new and desire to secure by Letters Patent:

1. A traffic signaling attachment device for bicycles each having a conventional bicycle frame, seat, a front and a rear wheel, drive cranking mechanism and crank sprocket wheel comprising, in combination, an elongated supporting framework, means for attaching said supporting framework to a bicycle so that said means for attaching is adapted to extend rearwardly of the bicycle seat above the rear bicycle wheel, an elongated control rod journaled along the length of said supporting framework, an elongated signal arm member fixed with respect to and extending substantially perpendicularly outwardly of said control rod, means releasably constraining said control rod so that said signal arm member normally extends in a vertically-upward direction, handle means connected to one end of said control for releasing said control rod for turning about its longitudinal axis to one or the other, selectively, of opposed, sidewardly-outwardly extending positions, and means for interconnecting said control rod and the bicycle drive cranking mechanism for automatically wagging the sidewardly-outwardly extending signal arm member through an arc of movement at the selected side, said means for interconnecting said control rod and the bicycle drive cranking mechanism comprising a cam lever for being pivotally connected at one end with respect to the bicycle frame, a cam roller for being rotatably journalled with respect to the bicycle crank sprocket wheel and operative to ride along the under-edge of said cam lever during a portion of each rotative cycle of said sprocket wheel for periodically lifting the other end of said cam lever between a lower-most position of rest and an elevated position, resilient means normally urging said cam lever into its position of rest, and a chain interconnecting an outer end portion of said cam lever and the outer end of a connector pin extending radially-outwardly of said control rod in the vertically-downward position when said control rod is in its normal, releaseably-constrained position.

2. A traffic signaling attachment device for bicycles as defined in claim 1 wherein said handle means comprises a first control handle extending axially outwardly of said control rod and an auxiliary handle member intermediate the ends of said control rod for manipulation from behind the seat of a bicycle to which the signaling attachment device is applied, said auxiliary handle member comprising opposed side rod portions extending sidewardly-outwardly of the longitudinal axis of said control rod and being operative to abut edge portions of said elongated supporting framework for limiting the downward extent of the arcuate movement of said signal arm member during its wagging movement at one or the other selected sides.

3. A traffic signaling attachment device for bicycles as defined in claim 2 wherein said means releaseably constraining said control rod comprises a helical compression spring circumjacent said control rod and constrained between a forward end portion of said framework means and said first control handle, and a longitudinally-extending recess open to the rear of said framework and spaced directly above the journaling access of said control rod, said control rod, at its rearward end, comprising a right angularly bent portion receivable in said recess.

4. A traffic signaling attachment device for bicycles or the like as defined in claim 1 wherein said signal arm member is of a resilient and fully collapsible material, thereby enabling its bending to minimize obstruction to the bicycle rider upon his mounting or dismounting the bicycle.

5. A traffic signaling attachment device for bicycles or the like as defined in claim 4 wherein said signal arm member is fixed with respect to and extends coaxially outwardly of said rightangularly bent end portion of said control rod.

* * * * *